(12) United States Patent
Prinsen et al.

(10) Patent No.: US 8,645,853 B2
(45) Date of Patent: Feb. 4, 2014

(54) DISPLAYING VISUALIZATIONS LINKED TO ONE OR MORE DATA SOURCE QUERIES

(75) Inventors: Edward Prinsen, Vancouver (CA); Philip Coldrey Lo, Vancouver (CA); Julian Lars Gosper, Vancouver (CA); Chuen Chi Yau, North Vancouver (CA)

(73) Assignee: Business Objects Software Ltd., Dublin (IE)

( * ) Notice: Subject to any disclaimer, the term of this patent is extended or adjusted under 35 U.S.C. 154(b) by 1316 days.

(21) Appl. No.: 11/556,637

(22) Filed: Nov. 3, 2006

(65) Prior Publication Data
US 2008/0109740 A1 May 8, 2008

(51) Int. Cl.
*G06F 3/048* (2013.01)

(52) U.S. Cl.
USPC ............................ 715/769; 715/228; 715/764

(58) Field of Classification Search
USPC ................................ 715/228, 764, 769; 707/4
See application file for complete search history.

(56) References Cited

U.S. PATENT DOCUMENTS

| | | | | |
|---|---|---|---|---|
| 5,535,324 | A | * | 7/1996 | Alvarez et al. ................. 715/209 |
| 5,787,412 | A | * | 7/1998 | Bosch et al. ...................... 707/2 |
| 5,894,311 | A | * | 4/1999 | Jackson ......................... 345/440 |
| 6,008,809 | A | * | 12/1999 | Brooks .......................... 715/792 |
| 6,075,530 | A | * | 6/2000 | Lucas et al. .................... 715/804 |
| 6,222,540 | B1 | * | 4/2001 | Sacerdoti ....................... 345/581 |
| 6,411,313 | B1 | * | 6/2002 | Conlon et al. ................. 715/769 |
| 6,529,217 | B1 | * | 3/2003 | Maguire et al. ............... 715/769 |
| 6,750,864 | B1 | | 6/2004 | Anwar |
| 7,002,580 | B1 | * | 2/2006 | Aggala et al. ................. 345/440 |
| 7,168,035 | B1 | * | 1/2007 | Bell et al. ...................... 715/234 |
| 7,426,059 | B2 | * | 9/2008 | Broda et al. .................... 358/1.3 |
| 2002/0070953 | A1 | * | 6/2002 | Barg et al. ..................... 345/700 |
| 2002/0091681 | A1 | * | 7/2002 | Cras et al. ......................... 707/3 |
| 2003/0071814 | A1 | * | 4/2003 | Jou et al. ....................... 345/440 |
| 2004/0001092 | A1 | * | 1/2004 | Rothwein et al. ............. 345/763 |
| 2004/0181543 | A1 | * | 9/2004 | Wu et al. ....................... 707/102 |
| 2005/0010458 | A1 | * | 1/2005 | Holloway et al. ................ 705/7 |
| 2005/0060647 | A1 | * | 3/2005 | Doan et al. .................... 715/514 |
| 2005/0232055 | A1 | * | 10/2005 | Couckuyt et al. ............. 365/227 |
| 2006/0031775 | A1 | | 2/2006 | Sattler et al. |
| 2007/0061752 | A1 | * | 3/2007 | Cory ............................. 715/804 |
| 2007/0130113 | A1 | * | 6/2007 | Ting ............................... 707/2 |
| 2007/0239573 | A1 | * | 10/2007 | Tien et al. ....................... 705/35 |
| 2007/0240047 | A1 | * | 10/2007 | Kosov et al. .................. 715/700 |
| 2007/0265930 | A1 | * | 11/2007 | Mohr ............................. 705/26 |
| 2007/0300172 | A1 | * | 12/2007 | Runge et al. .................. 715/764 |
| 2008/0005685 | A1 | * | 1/2008 | Drews et al. .................. 715/764 |
| 2008/0028021 | A1 | * | 1/2008 | Roberts et al. ................ 709/203 |

OTHER PUBLICATIONS

International Search Report and Written Opinion for International Application No. PCT/US2007/083338, mailed on May 9, 2008, 6 pages.

* cited by examiner

*Primary Examiner* — Tuyetlien Tran
(74) *Attorney, Agent, or Firm* — Mintz, Levin, Cohn, Ferris, Glovsky and Popeo, P.C.

(57) ABSTRACT

A computer readable storage medium includes executable instructions to provide a Graphical User Interface with a plurality of visualization types and a semi-structured workspace. A drag-and-drop of a visualization type into a drop zone in the semi-structured workspace is received. The drop zone corresponds to a location in the semi-structured workspace where an associated visualization is displayed. A link is created between the associated visualization and a query to a data source.

12 Claims, 12 Drawing Sheets

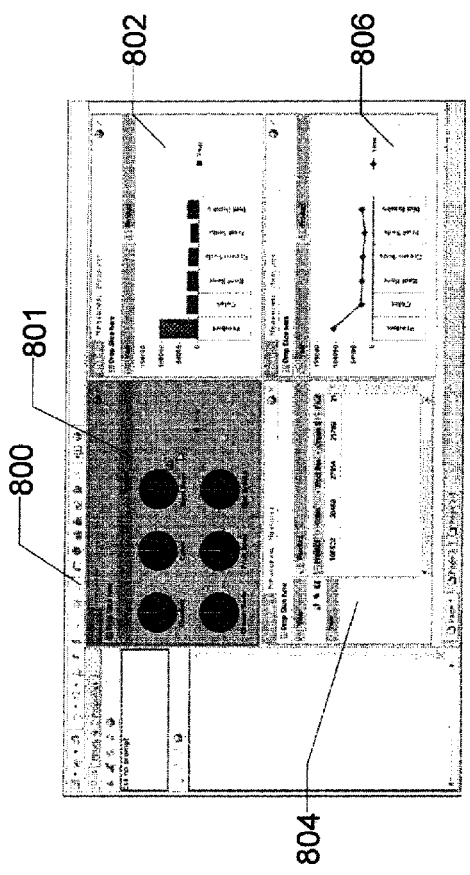
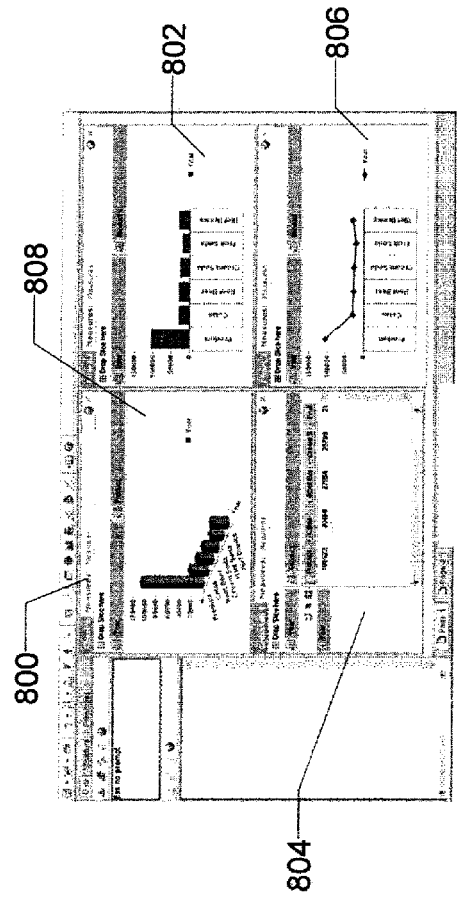
FIG. 8A
FIG. 8B

DISPLAYING VISUALIZATIONS LINKED TO ONE OR MORE DATA SOURCE QUERIES

BRIEF DESCRIPTION OF THE INVENTION

This invention relates generally to visualizing data. More particularly, this invention relates to displaying a variety of visualizations for one or more data source queries simultaneously.

BACKGROUND OF THE INVENTION

Data analysis tools provide a user with one of two types of workspace, a freeform workspace or a structured workspace. A freeform workspace provides a great deal of flexibility in layout. Indeed, it often provides more flexibility than is needed for data analysis and it becomes time consuming to layout the required information. A structured workspace is too rigid. While the process of laying out the required information is fast, the lack of flexibility prevents the user from viewing the data in an optimal format.

In view of the foregoing, it would be highly desirable to develop a data analysis workspace that finds a middle ground between flexibility and speed during layout.

SUMMARY OF INVENTION

The invention includes a computer readable storage medium with executable instructions to provide a Graphical User Interface with a plurality of visualization types and a semi-structured workspace. A drag-and-drop of a visualization type into a drop zone in the semi-structured workspace is received. The drop zone corresponds to a location in the semi-structured workspace where an associated visualization is displayed. A link is created between the associated visualization and a query to a data source.

The invention also includes a computer readable storage medium with executable instructions to provide a Graphical User Interface with a plurality of visualizations. The plurality of visualizations are linked to a query to a data source. An action is received within a visualization of the plurality of visualizations and the action updates the query to the data source. The plurality of visualizations is updated based on the results of the query.

BRIEF DESCRIPTION OF THE FIGURES

The invention is more fully appreciated in connection with the following detailed description taken in conjunction with the accompanying drawings, in which:

FIGS. 8A and 8B illustrate replacing a component in the semi-structured workspace configured in accordance with an embodiment of the invention.

Like reference numerals refer to corresponding parts throughout the several views of the drawings.

DETAILED DESCRIPTION OF THE INVENTION

Figure 1:
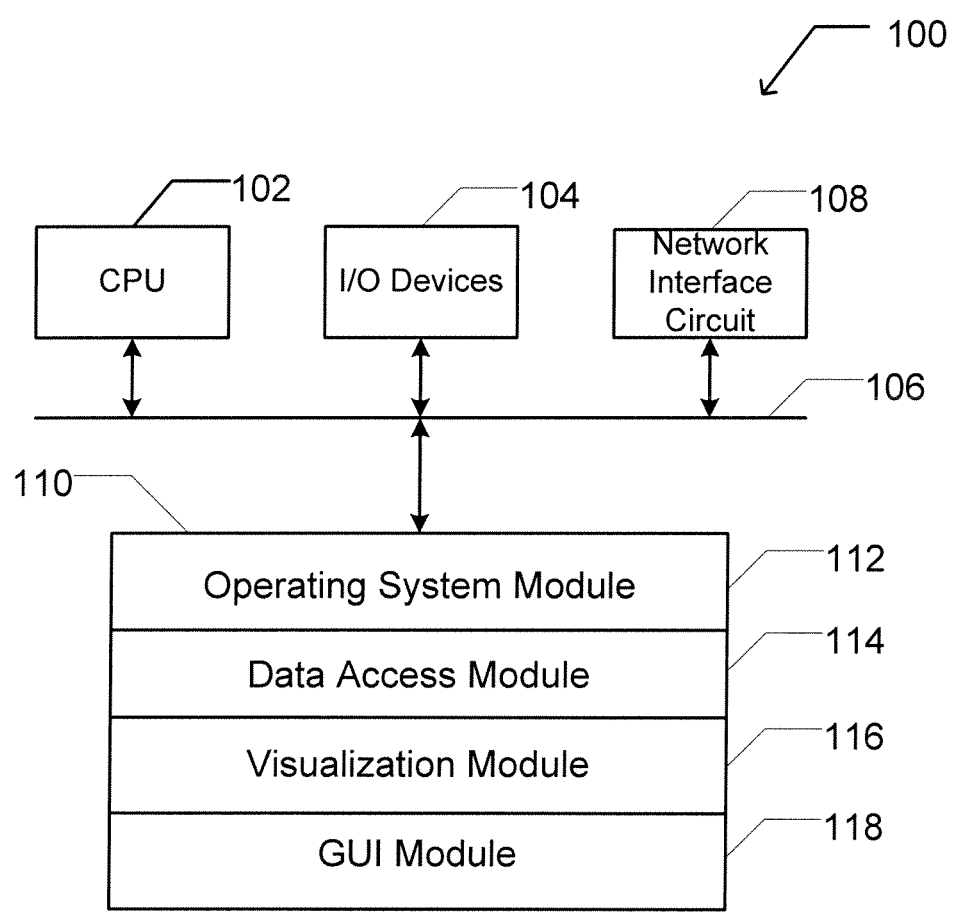
FIG. 1 illustrates a computer constructed in accordance with an embodiment of the invention.

The following terminology is used while disclosing embodiments of the invention:

An associated visualization is a visualization that is displayed as a result of drag-and-dropping a visualization type into a semi-structured workspace. An associated visualization is the same type of visualization as the drag-and-dropped visualization type.

Axis swapping is the action of replacing a data hierarchy on an x-axis of a chart or graph with a data hierarchy on a y-axis of the chart or graph and vice versa.

A chart is a collection of visual elements used to convey information (e.g. a pie chart, a bar graph, a scatter plot, a line graph). A chart is a visualization.

A click is a depression and release of a button.

Column expansion is the action of opening out or collapsing of a data hierarchy on an x-axis of a crosstab.

A crosstab (abbreviation of cross-tabulation) is a visualization of data that displays a joint distribution of two or more variables simultaneously. Crosstabs are usually presented in a matrix format. Each cell shows a value associated with a specific combination of row and column headings.

Drag-and-drop is the action of clicking on an item and dragging it to a different location or onto another item. In general, it can be used to invoke many kinds of actions, such as copying or moving, or create various types of associations between two items.

Drilldown is the action of progressing from a first data presentation to a more detailed data presentation by focusing in on information of interest to a user. This can be done, e.g., by accessing information starting with a general category and moving through a hierarchy to obtain specific information relating to the general category.

Drillup is the action of progressing from a first data presentation to a broader data presentation by summarizing detailed information. This can be done, e.g., by accessing information starting with specific information relating to a general category and moving up through a hierarchy to obtain information relating to the general category.

A drop zone is an area of a semi-structured workspace into which a user can drag-and-drop a visualization type. A drop zone corresponds to a location, usually larger than the drop zone, in the semi-structured workspace where a visualization associated with the visualization type will be displayed.

A hotkey is a key or set of keys on an input device that has a specific function in an application.

Member selection is the action of indicating which elements in a data hierarchy on an x-axis of a chart or graph and a data hierarchy on a y-axis of the chart or graph to include in their respective hierarchies.

A semi-structured workspace is a distinct section of a Graphical User Interface that accepts user input. More specifically, it allows a user to select one or more visualizations and arrange them in a limited number of configurations.

Point-and-click is the action of a user moving a cursor to a certain location on an output device and then clicking a button on a mouse or other pointing device or pressing a button or key on another form of input device.

Row expansion is the action of opening out or collapsing of a data hierarchy on a y-axis of a crosstab.

A table maps the logical structure of a set of data into a series of columns or rows. Thus, a table is a visualization. To facilitate representation in two dimensions, higher-dimensional tables of data are often represented in an exploded view comprising a plurality of two dimensional tables. A table can be rectangular, triangular, octagonal, etc. A table can have row and column headings, where each cell in a table can show the value associated with the specific combination of row and column headings. Some tables can hold charts or maps in their cells; this is a spatially economic way to display many charts with common axes. A table is to be conceptually differentiated from a database table.

Timing out is when a predefined length of time runs out.

A visualization is a graphic display of quantitative information. Types of visualizations include charts, tables, crosstabs, record sets, graphics and metadata panels.

A visualization type is a form of a graphic display of quantitative information. Types of visualizations include charts, tables, crosstabs, record sets, graphics and metadata panels. A visualization type may be represented by a Graphical User Interface widget which is associated with a visualization.

FIG. 1 illustrates a computer 100 configured in accordance with an embodiment of the invention. The computer 100 includes standard components, including a central processing unit 102 and input/output devices 104, which are linked by a bus 106. The input/output devices 104 may include a keyboard, mouse, touch screen, monitor, printer, and the like. A network interface circuit 108 is also connected to the bus 106. The network interface circuit (NIC) 108 provides connectivity to a network (not shown), thereby allowing the computer 100 to operate in a networked environment.

A memory 110 is also connected to the bus 106. In an embodiment, the memory 110 stores one or more of the following modules: an operating system module 112, a data access module 114, a visualization module 116 and a Graphical User Interface (GUI) module 118.

The operating system module 112 may include instructions for handling various system services, such as file services or for performing hardware dependant tasks.

The data access module 114 includes executable instructions to apply the data source query (e.g., a Structured Query Language (SQL) query, a MultiDimensional eXpressions (MDX) query, a Data Mining Extensions (DMX) query) generated by the visualization module 116 to an underlying data source (not shown), which may form a portion of computer 100 or may be accessed as a separate networked machine through the network interface circuit 108.

The visualization module 116 includes executable instructions to receive a drag-and-drop of a visualization type into a drop zone in the workspace and create a link between the associated visualization and a previously defined data source query. The visualization module 116 also includes executable instructions to receive actions performed on the visualizations and update the data source query appropriately.

The GUI module 118 includes executable instructions to render a GUI with a semi-structured workspace populated by a selection of data visualizations. The GUI module 118 may rely upon standard techniques to produce graphical components of a user interface, e.g., windows, icons, buttons and menus.

The executable modules stored in memory 110 are exemplary. It should be appreciated that the functions of the modules may be combined. In addition, the functions of the modules need not be performed on a single machine. Instead, the functions may be distributed across a network, if desired. Indeed, the invention is commonly implemented in a client-server environment with various components being implemented at the client-side and/or the server-side. It is the functions of the invention that are significant, not where they are performed or the specific manner in which they are performed.

Figure 2:
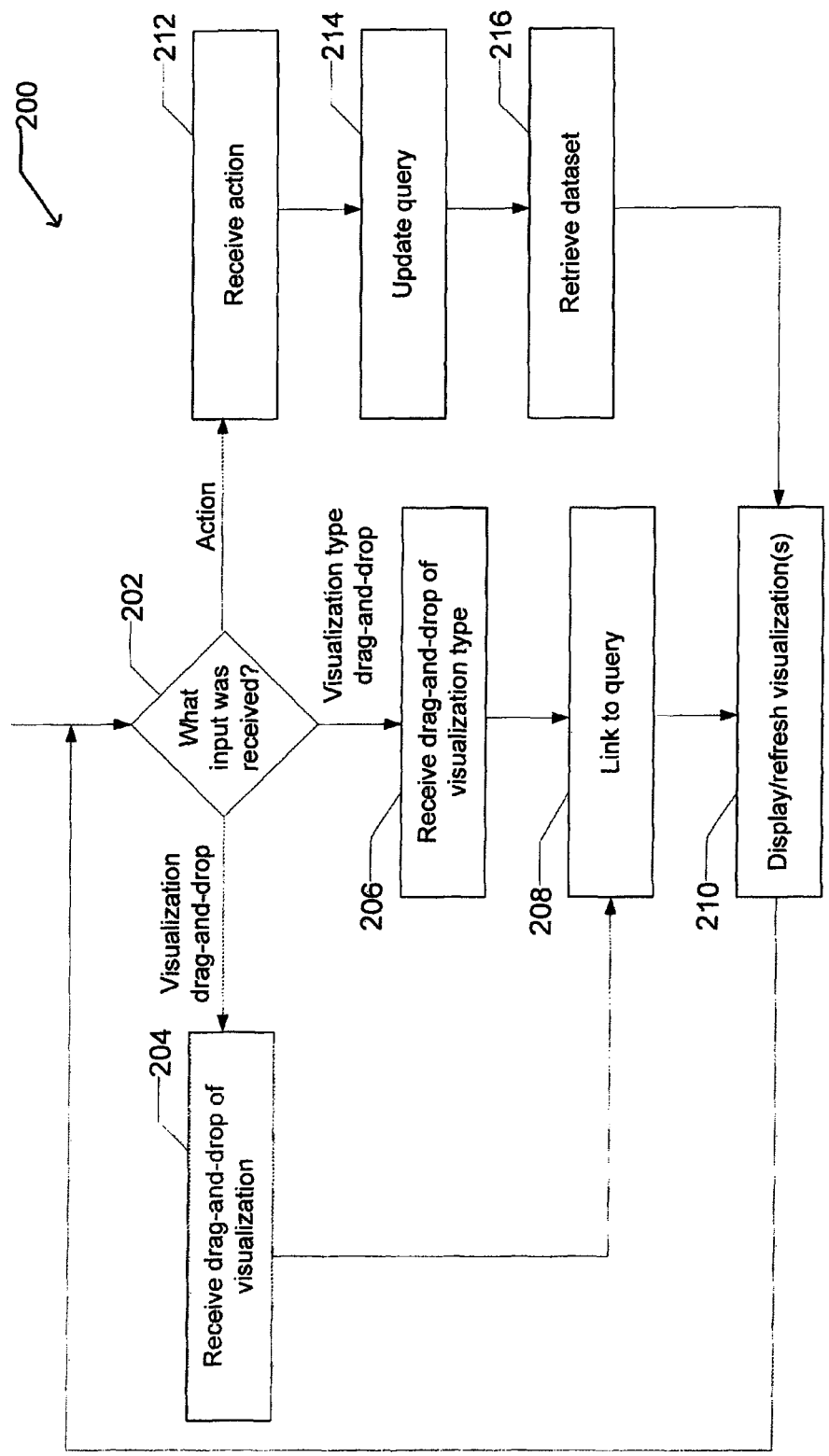
FIG. 2 illustrates processing operations associated with an embodiment of the invention.

FIG. 2 illustrates a high level workflow that may be implemented by the computer 100 while executing instructions from the data access module 114 or the visualization module 116. The processing operations 200 illustrate the process of a user's interactions with a semi-structured workspace in an embodiment of the invention.

In the first processing operation 202, the visualization module 116 waits for input from the user 202. If the user swaps an existing visualization within the semi-structured workspace with another existing visualization (202—Visualization drag-and-drop), the visualization module 116 receives the drag-and-drop of the visualization 204, links the visualization to the appropriate query 208 and the GUI module 118 displays the visualization 210. The visualization module 116 then waits for another input 202. If the user inserts a new visualization into the semi-structured workspace (202—Visualization type drag-and-drop), the visualization module 116 receives the visualization type drag-and-drop 206, links the visualization to the appropriate query 208 and the GUI module 118 displays the visualization 210. The visualization module 116 then waits for another input 202. If the user performs an action on one of the existing visualizations (e.g., drilldown, row expansion, axis swap) (202—Action), the visualization module receives the action 212, updates the associated query 214, retrieves a new dataset 216 and the GUI module 118 refreshes the visualization 210. The visualization module 116 then waits for another input 202.

Figure 3:
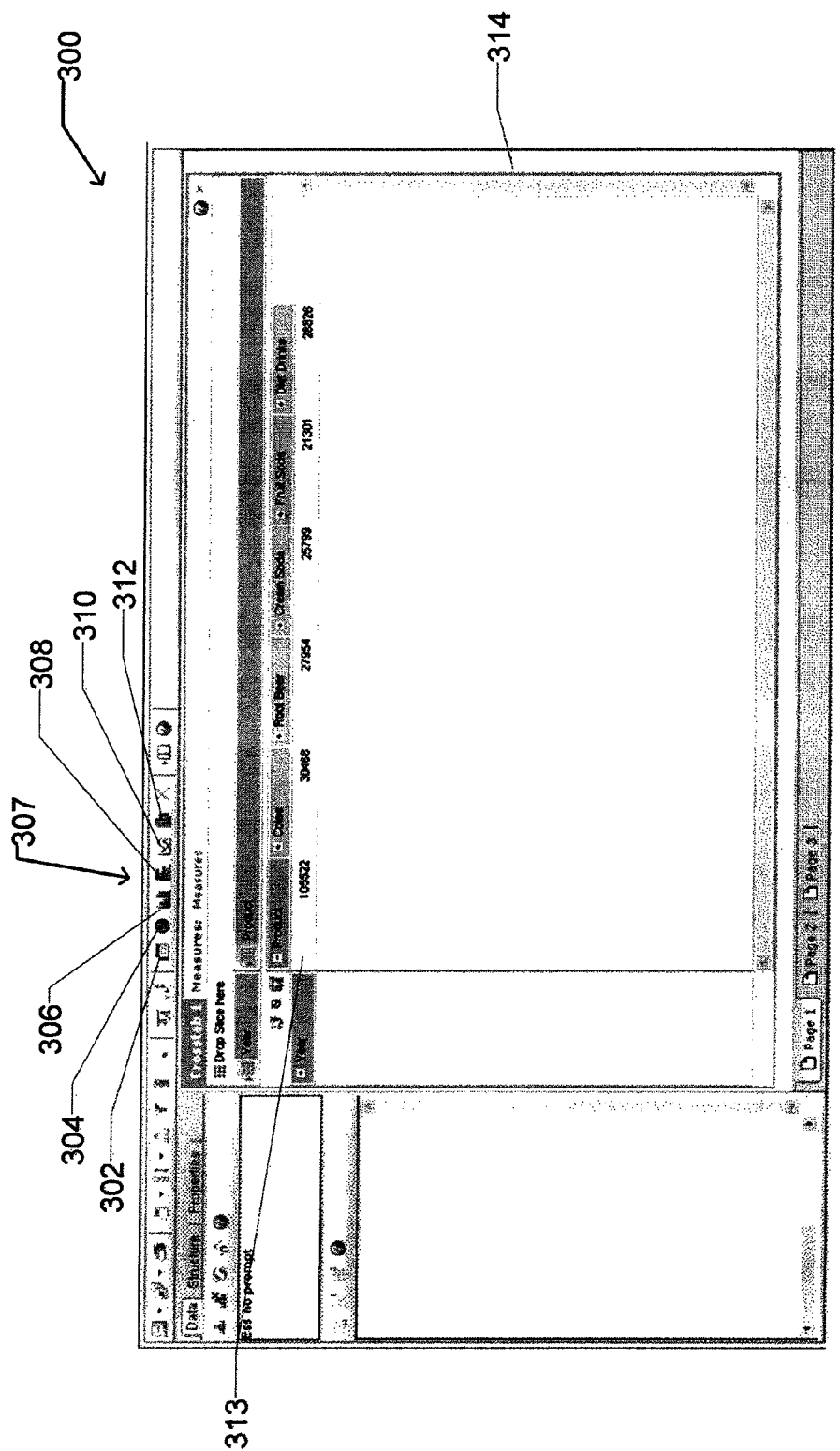
FIG. 3 illustrates a Graphical User Interface configured in accordance with an embodiment of the invention.

FIG. 3 illustrates a Graphical User Interface (GUI) 300 used to implement an embodiment of the invention. The toolbar 307 includes the visualization types that are used to add visualizations to the semi-structured workspace 314. In an embodiment, the toolbar 307 includes visualization types in the form of icons for crosstabs 302, pie charts 304, vertical bar graphs 306, horizontal bar graphs 308, line graphs 310 and three-dimensional bar graphs 312. In other embodiments, the visualization types are represented in the toolbar as list items, text labeled buttons and the like. In other embodiments, the visualization types also include graphics, metadata panels and record sets. In an embodiment, a crosstab 313 is automatically displayed when a data source query is defined. In other embodiments, the user must specify the first visualization or another visualization is automatically displayed.

Figure 4:
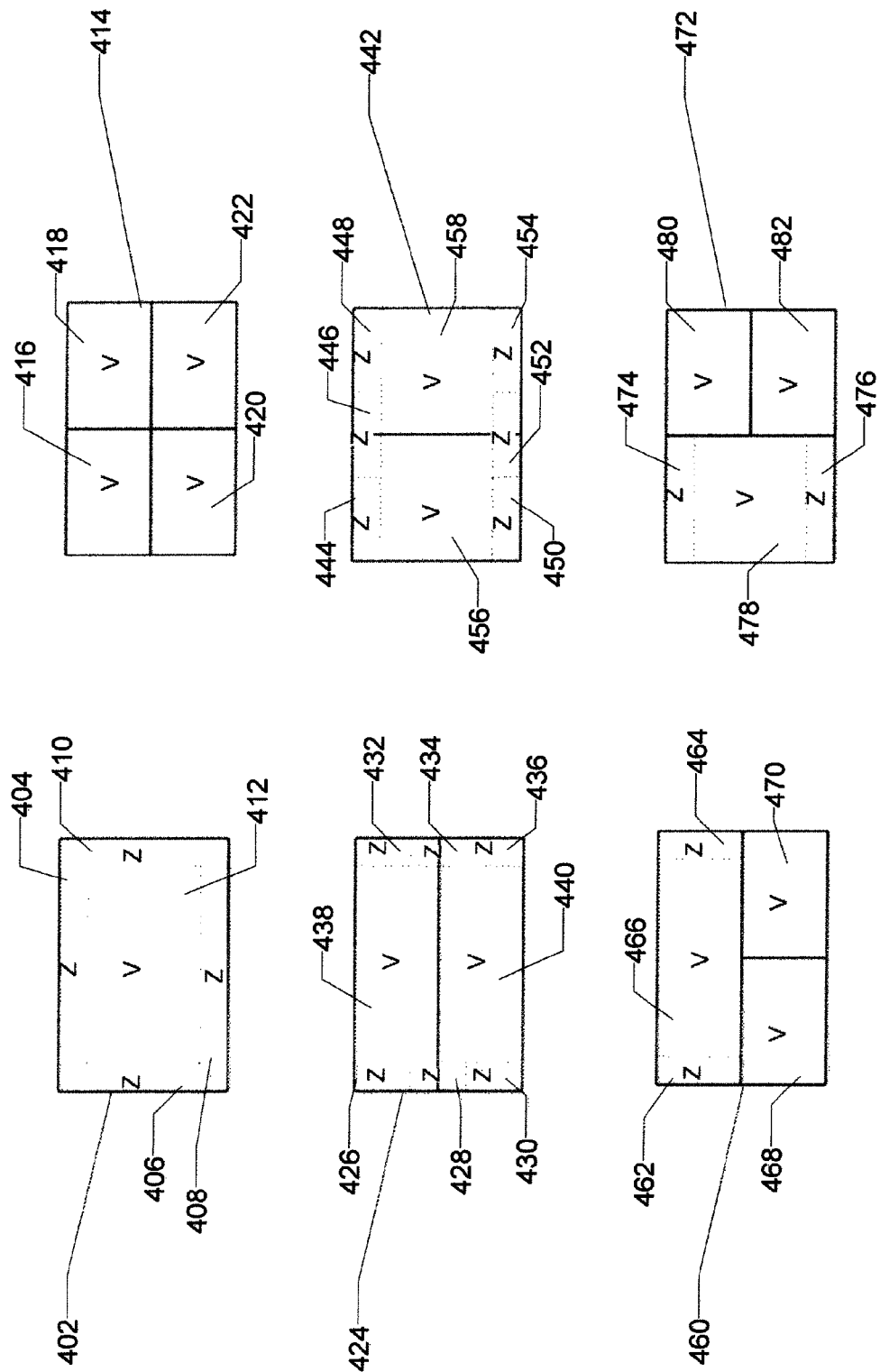
FIG. 4 illustrates the drop zones for different configurations of the semi-structured workspace configured in accordance with an embodiment of the invention.

FIG. 4 illustrates the drop zones for varied configurations of the semi-structured workspace in an embodiment of the invention. A drop zone is a designated area in the semi-structured workspace that corresponds to a visualization display location in the semi-structured workspace. If a visualization type or previously specified visualization is draggedand-dropped into a drop zone, it will be displayed in the corresponding location. Drop zones are indicated by "Z" and previously specified visualizations by "V".

The configuration 402 illustrates the drop zones available when the semi-structured workspace contains one visualization 412. As indicated by the dotted lines, in an embodiment, the drop zones for this configuration 402 are in the top 404, bottom 408, left 406 and right 410 of the semi-structured workspace. Dropping a visualization type in any of these four drop zones 404-410 triggers the visualization module 116 to divide the workspace in two, displaying the new visualization in the location corresponding to the drop zone, and the previously specified visualization 412 in the remaining area. In an embodiment, the workspace is divided in half. The top drop zone 404 corresponds to a top portion of the semi-structured workspace, the right drop zone 410 corresponds to a right portion of the semi-structured workspace, and so on.

The configuration 414 illustrates that there are no drop zones available when the semi-structured workspace contains four visualizations 416-422. In an embodiment, the semi-structured workspace contains a maximum of four visualizations. In other embodiments, more visualizations are allowed and drop zones are available in this case.

The configuration 424 illustrates that there are three drop zones on the left 426-430 and three drop zones on the right 432-436 of the semi-structured workspace when it is divided in two, 438 and 440, horizontally. In an embodiment, a visualization covers either one or two adjacent quadrants of the semi-structured workspace when there is more than one visualization displayed. The top left drop zone corresponds to the top left quadrant of the semi-structured workspace. The new visualization shares the top two quadrants of the semi-structured workspace with the visualization 438 currently in that location. The middle left drop zone corresponds to the left two quadrants of the workspace, the visualization module 116 shrinking the previously specified visualizations, 438 and 440, to be displayed in the top and bottom right quadrants. The bottom left drop zone corresponds to the bottom left quadrant. The new visualization shares the bottom two quadrants of the workspace with the previously specified visualization 440 in that location. The behavior of the right set of drop zones 432-436 is a mirror image to that of the left drop zones.

The configuration 442 illustrates that there are three drop zones at the top 444-448 and three drop zones at the bottom 450-454 of the semi-structured workspace when it is divided in two, 456 and 458, vertically. The behavior of these drop zones is very similar to those of configuration 424; they are simply rotated ninety degrees.

The configuration 460 illustrates that there are two available drop zones 462 and 464 when the semi-structured workspace is divided into three sections 466-470 with a horizontal major section. In an embodiment, a major section of the semi-structured workspace consists of two adjacent quadrants and a minor section is a single quadrant. The left drop zone 462 corresponds to the left quadrant of the major section. The visualization module 116 shrinks the previously specified visualization 466 in the major section to the right quadrant. The right drop zone 464 corresponds to the right quadrant of the major section. The visualization module 116 shrinks the previously specified visualization 466 in the major section to the left quadrant. The major section can be at the top or bottom of the semi-structured workspace.

The configuration 472 illustrates that there are two drop zones, 474 and 476, available when the workspace is divided into three sections 478-482 with a vertical major section. The behavior of these drop zones is very similar to those of configuration 460; they are simply rotated ninety degrees. The major section can be at the left or right of the semi-structured workspace.

Figure 5A:
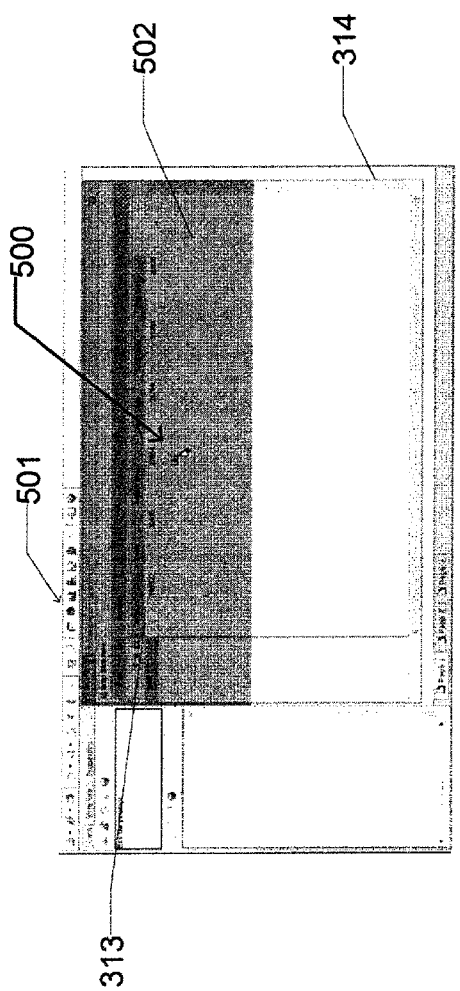
FIGS. 5A and 5B illustrate inserting a second component into the semi-structured workspace configured in accordance with an embodiment of the invention.
Figure 5B:
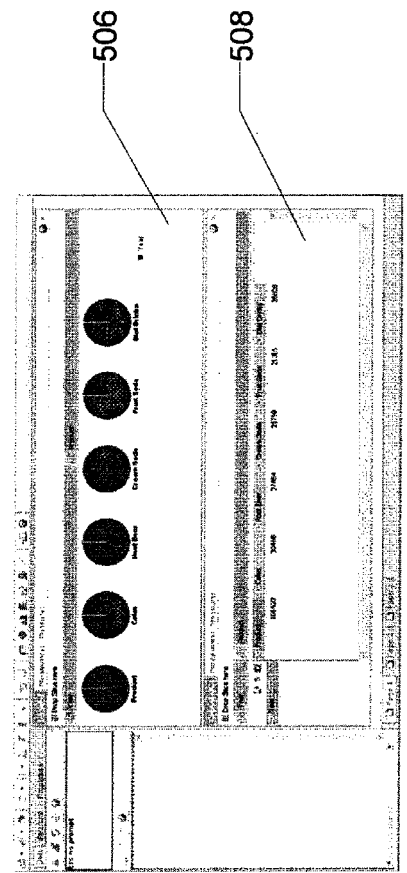

FIGS. 5A and 5B illustrate the process of adding a visualization to the semi-structured workspace 314 that already contains a single visualization 313 in an embodiment of the invention. In an embodiment, when the user drags a visualization type 501 onto the semi-structured workspace 314, a chart icon 500 appears at the tip of the mouse pointer. When the chart icon 500 is hovered over a spot on the semi-structured workspace 314, the visualization module 116 highlights an area 502 of the workspace 314 to indicate the location that the new visualization will appear. When the visualization type 501 is dropped, the visualization module 116 receives the visualization type drag-and-drop and displays the pie chart visualization 506 in the location corresponding to the previously highlighted area 502. The previously displayed crosstab 313 shrinks to the lower portion 508 of the workspace 314. Note that the visualization module 116 automatically links the pie chart visualization 506 to a previously defined data source query and it is populated with data when it is first displayed.

Figure 6A:
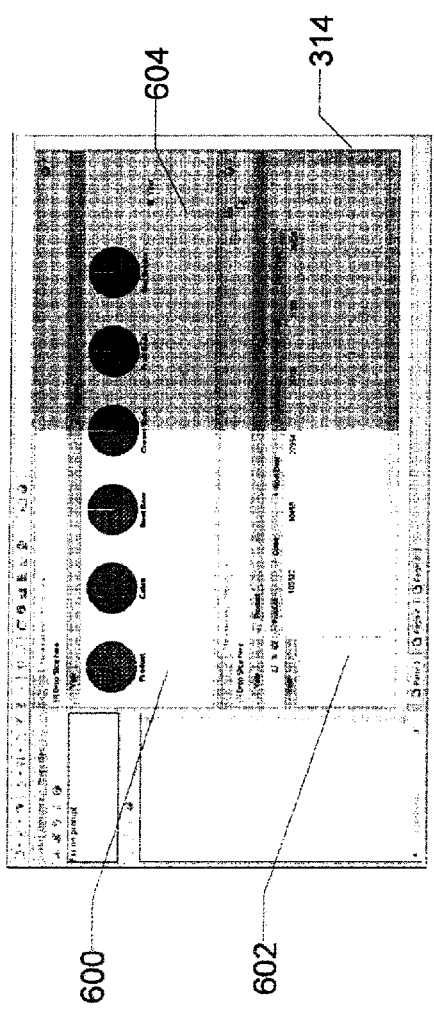
FIGS. 6A and 6B illustrate inserting a third component into the semi-structured workspace configured in accordance with an embodiment of the invention.
Figure 6B:
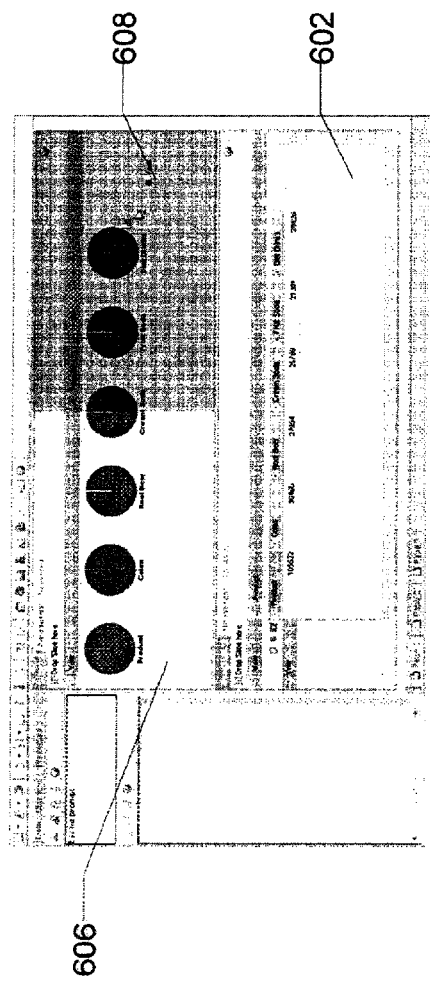

FIGS. 6A and 6B illustrate two example locations to add a third visualization. In an embodiment, a third visualization takes up a major portion 604 of the semi-structured workspace 314 or a minor portion 608. In an embodiment, if the third visualization is dropped into the major portion 604, then the previously existing pie chart visualization 600 and crosstab visualization 602 shrink to half their current sizes, being displayed in the top and bottom left quadrants. In an embodiment, if the third visualization is dropped into the minor portion 608, then the previously existing pie chart visualization 606 shrinks to the half its current size, being displayed in the top left quadrant. The previously existing crosstab visualization 602 remains in its original state. In an embodiment, the third visualization may also be dropped into the left half, the top-left quadrant, the bottom-left quadrant or the bottom-right quadrant of the workspace in addition to those areas illustrated in FIGS. 6A and 6B.

Figure 7:
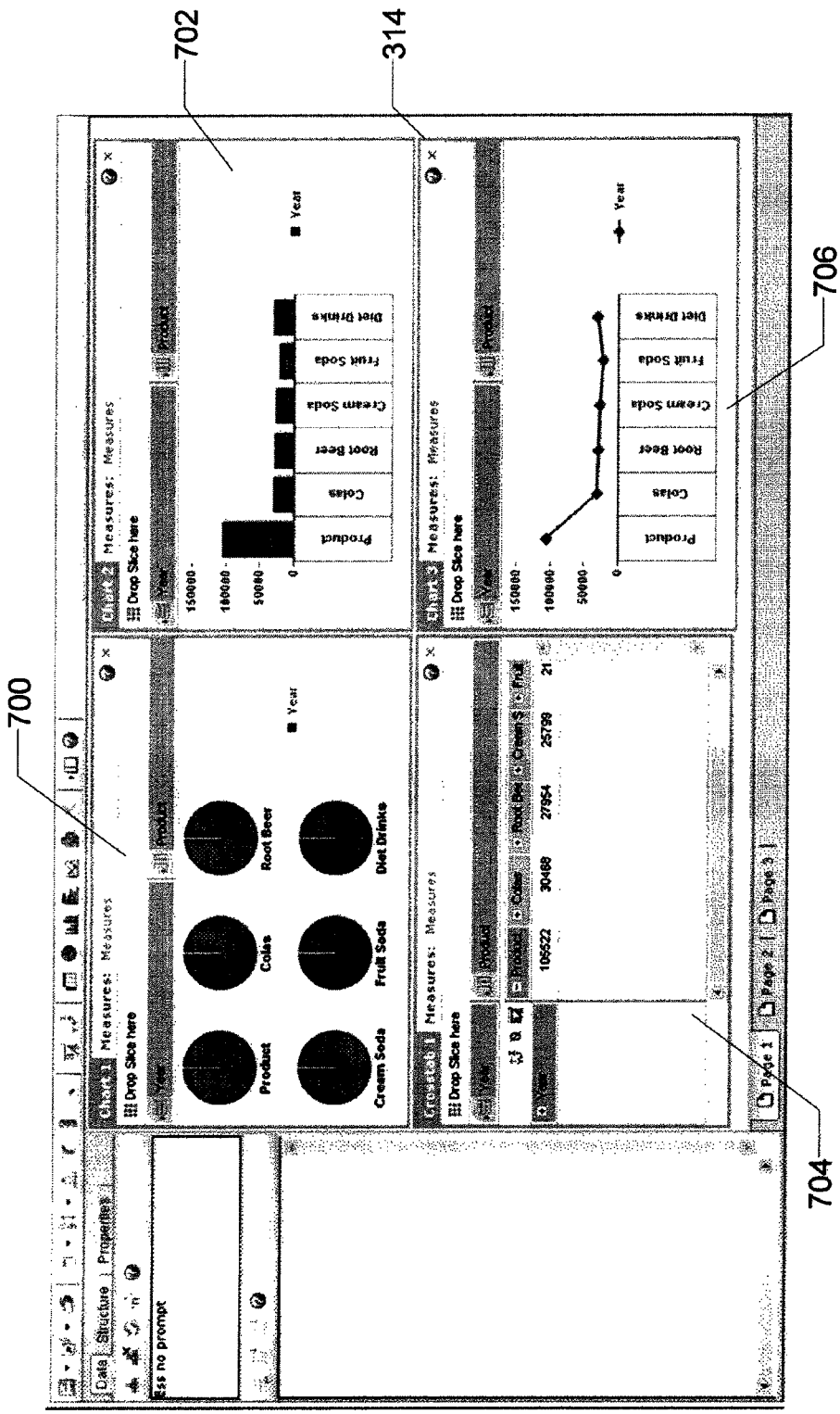
FIG. 7 illustrates the four-component configuration of the semi-structured workspace configured in accordance with an embodiment of the invention.

FIG. 7 illustrates a configuration of the semi-structured workspace 314 containing four visualizations: a pie chart 700, a vertical bar graph 702, a crosstab 704 and a line graph 706. In an embodiment, the workspace holds a maximum of four visualizations. This number is larger or smaller in other embodiments (e.g., 2, 6, 8, 10, 12, 14, 16).

FIGS. 8A and 8B illustrate the process of replacing a currently existing visualization with a new visualization. In an embodiment, the user may drag-and-drop a visualization type into a location already containing a visualization. When the desired location 800 is highlighted, the user drops the visualization type to initiate a replace. The new visualization 808 is displayed in the desired location 800 and is automatically linked to the data source query that was linked to the previous visualization 801. The other previously existing visualizations—the vertical bar chart 802, the crosstab 804 and the line graph 806—do not change.

In an embodiment, the user may also replace a currently existing visualization with another currently existing visualization. This process is referred to as swapping. In this case, the user drags a currently existing visualization into the location of another currently existing visualization. Once the desired location is highlighted, the user drops the visualization into the location. The visualization module 116 receives the visualization drag-and-drop and exchanges the locations of the two visualizations. The dragged-and-dropped visualization is displayed in the new location, and the visualization that was previously displayed there is displayed in the location of dragged-and-dropped visualization.

Figure 9:
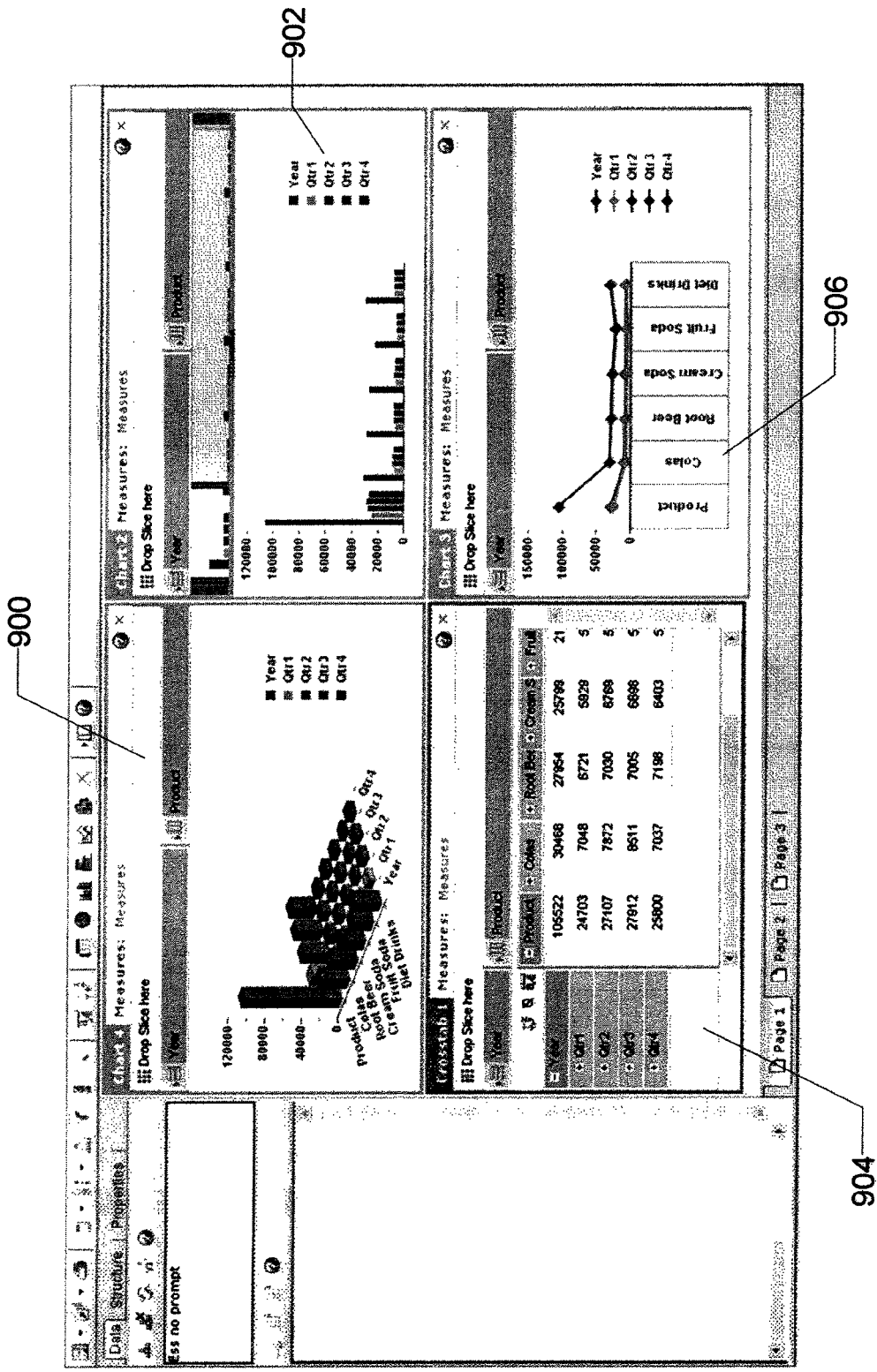
FIG. 9 illustrates performing a row expansion action configured in accordance with an embodiment of the invention.

FIG. 9 illustrates row expansion in an embodiment of the invention. When the user clicks on an expansion button (e.g., a plus sign) for a category in the data hierarchy of the crosstab 904, the visualization module 116 receives the row expansion action, updates the data source query linked to the visualization and the data access module 114 retrieves an updated dataset. The visualization module 116 then refreshes the crosstab 904 and all associated visualizations. The row hierarchy category is expanded to reveal sub-categories and the expansion button is changed to a collapse button (e.g., a minus sign) as in the crosstab 904. As illustrated by the three-dimensional bar chart 900, the vertical bar chart 902 and the line graph 906, different visualizations represent this expansion in different ways. The three-dimensional bar chart 900 displays the subcategories by adding a third dimension to the chart. The vertical bar chart 902 displays the subcategories by adding a bar for each subcategory in each category on the x-axis. The line graph 906 displays the subcategories by adding a line for each subcategory. Note that all the visualizations still display the year data as in previous figures, but they also show the data for each quarter as broken down by the sub-categories.

A row expansion is reversed by clicking on a collapse button. The visualization module 116 receives the row collapse action, updates the data source query linked to the visualization and the data access module 114 retrieves an updated dataset. The visualization module 116 then refreshes the crosstab and all associated visualizations. The row hierarchy category is collapsed down to the parent category and the collapse button is changed to an expansion button. The associated visualizations are collapsed to display data for the parent category and any categories higher in the data hierarchy.

Column expansion and column collapse are similar actions that the user can perform. These actions behave in the same way as their row action counterparts. The differences being that columns are expanded and collapsed in the crosstab rather than rows, and the categories on the x-axis of the other visualizations are affected.

Figure 10:
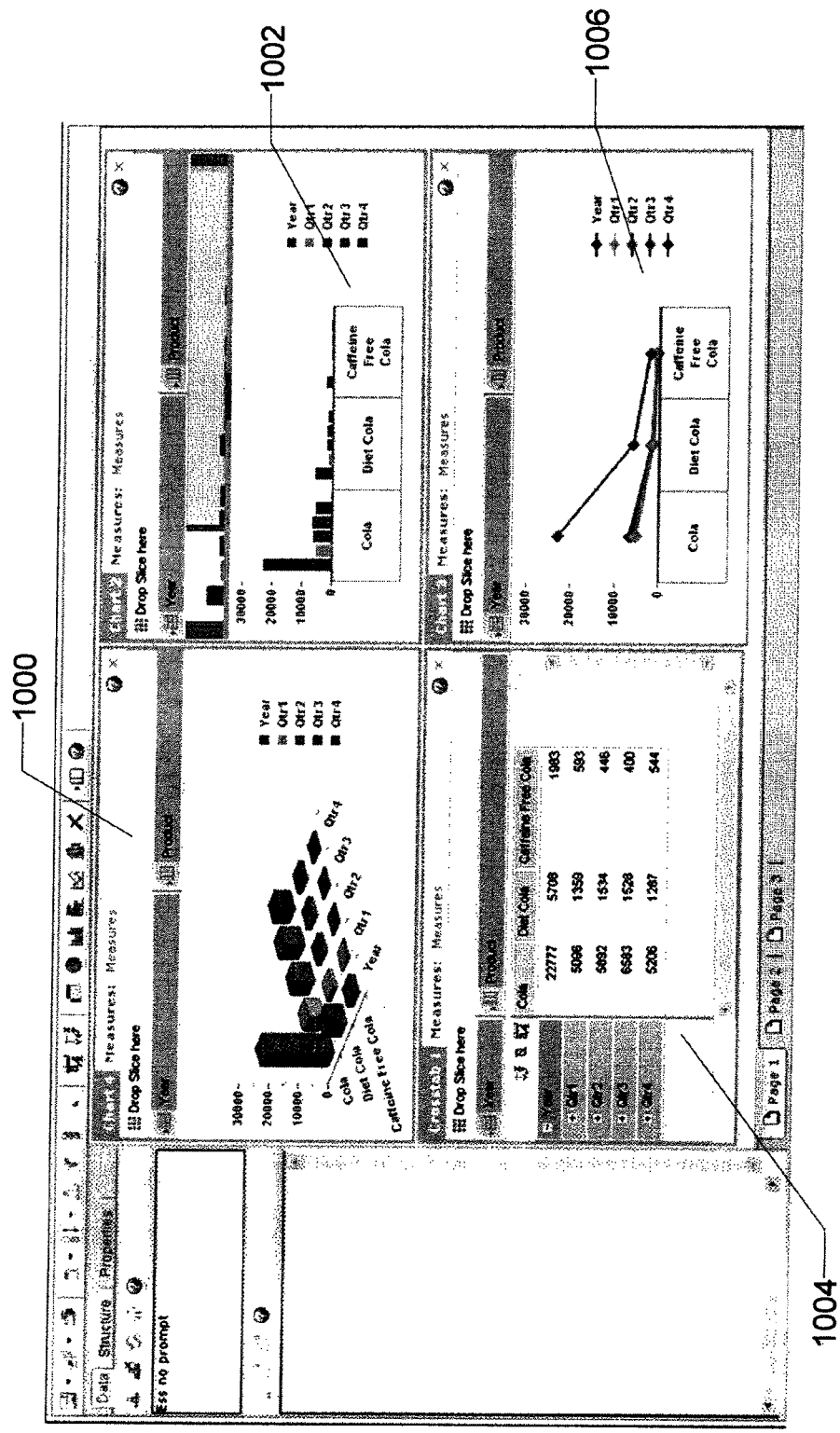
FIG. 10 illustrates performing a drilldown action configured in accordance with an embodiment of the invention.

FIG. 10 illustrates the result of a drilldown action. In an embodiment, the user double-clicks on an element in a visualization (e.g., a line in a graph, a portion of a pie chart, a data hierarchy category) to drilldown. Upon specifying a drilldown action, the visualization module 116 updates the associated data source query and the data access module 114 returns a new dataset. The visualization module 116 updates all visualizations associated with the data source query (i.e., the three-dimensional bar chart 1000, the vertical bar graph 1002 and the line graph 1006) to reflect the new dataset. For example, after drilling down on the "Colas" category, the associated visualizations are updated to display only the sub-categories of the "Colas" category as illustrated by the column headers of the crosstab 1004 and the x-axis values of the three-dimensional bar graph 1000, the vertical bar graph 1002 and the line graph 1006.

In an embodiment, a drillup action can also be performed. This reverses the results of a drilldown. Upon specifying a drillup action, the visualization module 116 updates the associated data source query and the data access module 114 returns a new dataset. The visualization module 116 updates all visualizations associated with the data source query to reflect the new dataset. For example, after rolling up on the "Colas" sub-categories, the associated visualizations are updated to display all the categories at the parent category level.

In an embodiment, similar results are gained by performing a member selection. In a member selection, the user indicates the specific categories to be displayed in the visualizations. Categories are selected from any level of a hierarchy, and selecting a parent category does not require that the sub-categories be included. Once the members have been indicated, the visualization module 116 receives the member selection action and updates the associated data source query. The data access module 114 retrieves a new dataset and the visualization module 116 refreshes all visualizations linked to the data source query.

In an embodiment, an axis swap action can also be performed. When the user requests an axis swap, the visualization module 116 receives the axis swap action and updates the associated data source query. The data access module 114 retrieves a new dataset and the visualization module 116 refreshes all visualizations linked to the data source query. The result is that the original row data hierarchy becomes the column data hierarchy and the column data hierarchy becomes the row data hierarchy in crosstab visualizations. In chart visualizations the x-axis becomes the y-axis and the y-axis becomes the x-axis.

In an embodiment, a visualization may be disconnected from its associated visualizations. A disconnected visualization is not affected by actions performed on its previously associated visualizations. Likewise, actions performed on a disconnected visualization do not affect its previously associated visualizations.

Figure 11:
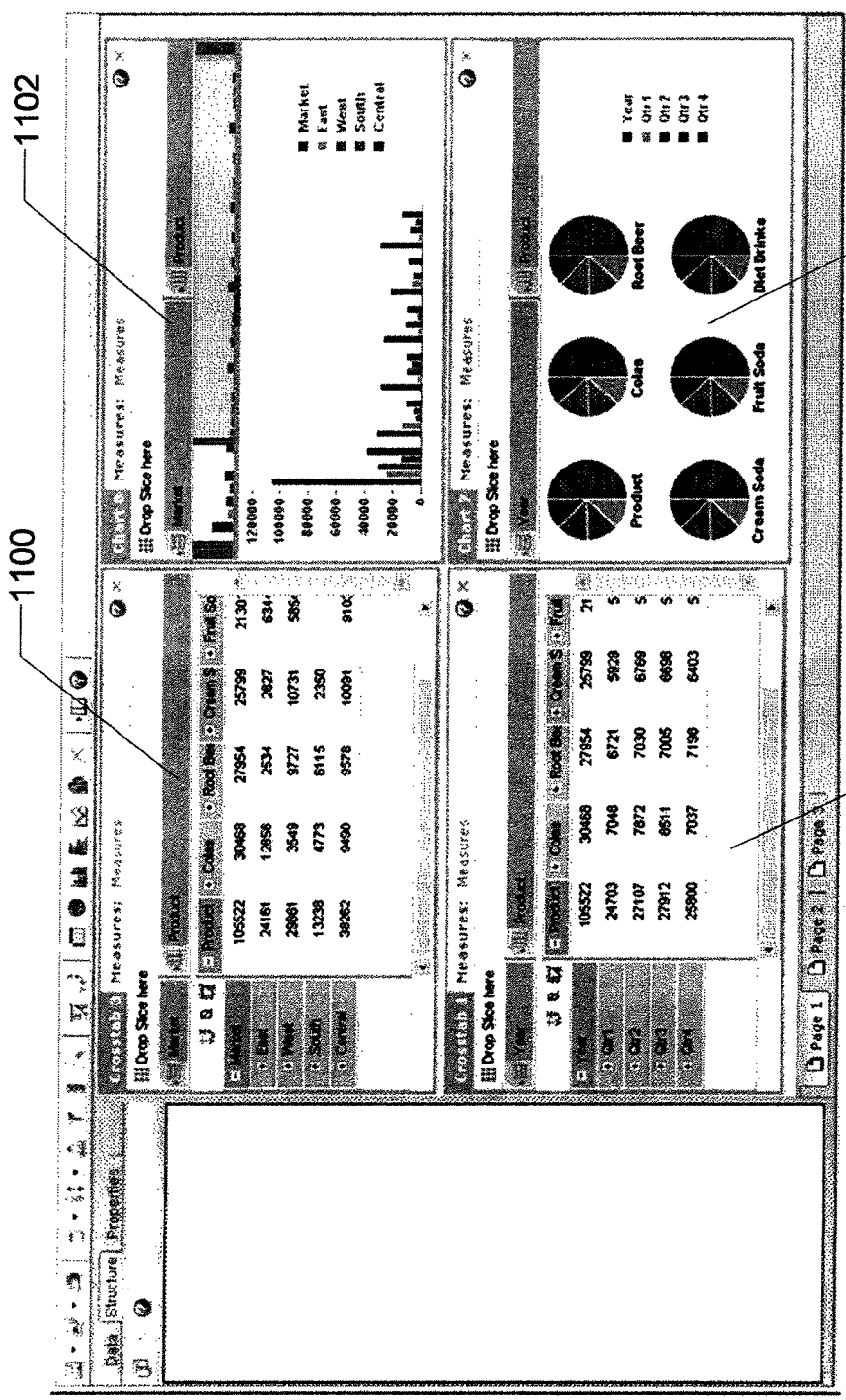
FIG. 11 illustrates the simultaneous display of components linked to two different data source queries configured in accordance with an embodiment of the invention.

FIG. 11 illustrates visualizations linked to two distinct data source queries. In an embodiment, a distinct data source query may be defined for each visualization displayed. In an embodiment, this is achieved by defining a new query and linking an existing visualization or a new visualization to the new query. In an embodiment, different data source queries can access different data sources. The crosstab 1100 and the bar chart 1102 are linked to one query which breaks down product by market. The crosstab 1104 and the pie chart 1106 are linked to a second query which breaks down product by year. If an action is performed on either of the crosstabs, 1100 or 1104, when the visualization module 116 updates the crosstab, its associated chart visualization, 1102 or 1116 respectively, is also updated. Similarly, if an action is performed on either of the chart visualizations, the visualization module 116 updates both the chart visualization and associated crosstab. If any of the visualizations, 1100-1106, are replaced by a new visualization, the new visualization is automatically linked to the data source query that was linked to the replaced visualization.

Figure 12:
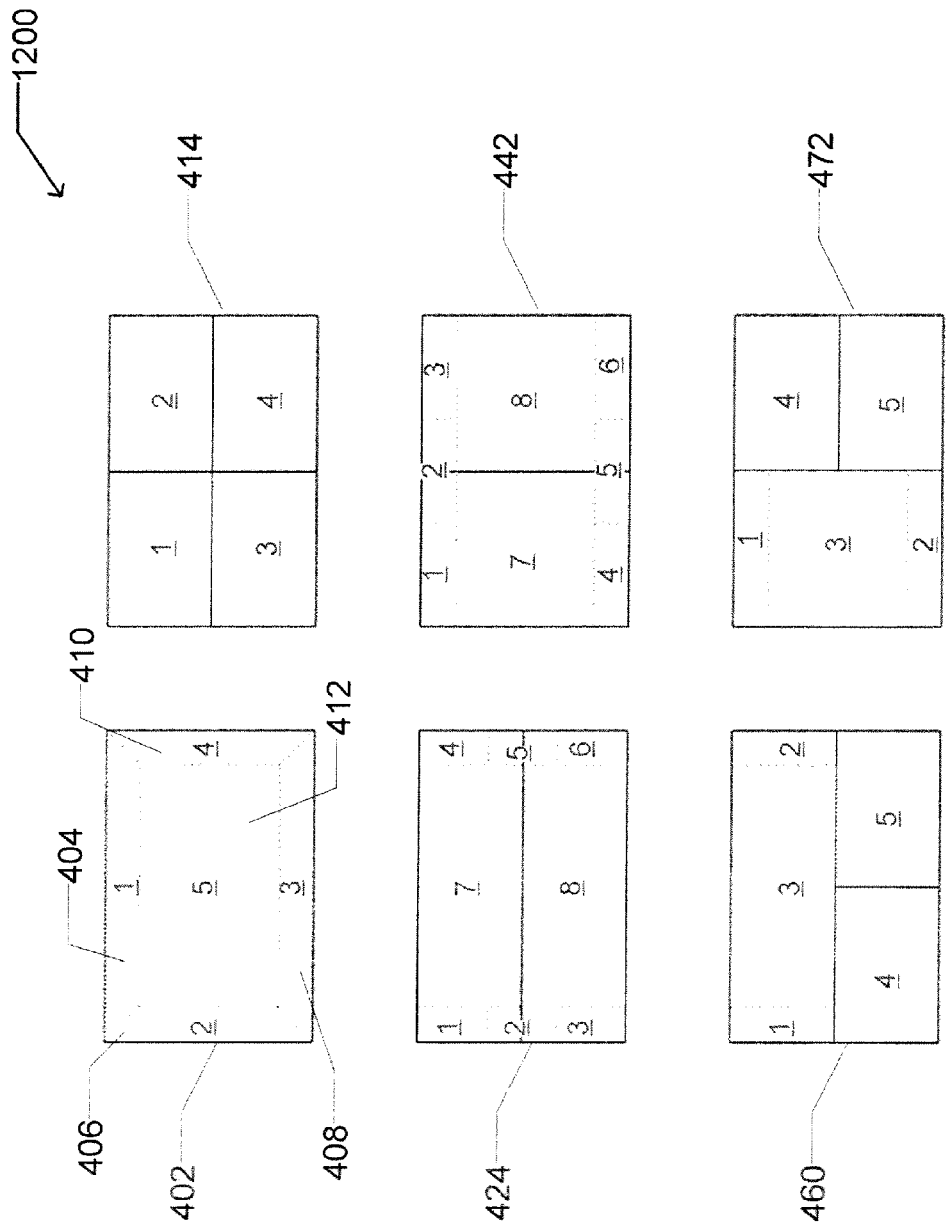
FIG. 12 illustrates the drop zones of FIG. 4 with the addition of exemplary drop zone selection orders configured in accordance with an embodiment of the invention.

In an embodiment, an alternate drop mode is also used. FIG. 12 illustrates the drop zones of FIG. 4 with the addition of exemplary drop zone selection orders. In an embodiment, the user activates the alternate drop mode by pressing an activation hotkey. In other embodiments, the alternate drop mode is activated by clicking a visualization type, clicking an alternate drop mode button, holding down a visualization type button, holding down a hotkey and the like. Once the alternate drop mode is activated, the visualization module 116 responds to repeated presses of another hotkey by moving through a list of available drop zones in a predetermined order. The configurations 1200 each have a unique drop zone selection order, which includes all the drop zones—to insert a new visualization—and all the previously specified visualizations—to perform a replace. For example, the drop zone selection order for configuration 402 of FIG. 12 is a counter-clockwise movement through the drop zones 404-410 followed by the previously specified visualization 412. In an embodiment, the other configurations 414, 424, 442, 460 and 472 follow similar patterns. As the user moves through the drop zones 404-410 and visualizations 412, the location corresponding to the currently selected drop zone or visualization is highlighted in the same fashion as in the drag-and-drop method. Once the user has selected the desired drop zone for the new visualization, the new visualization is dropped to the corresponding location by pressing the activation hotkey again. In other embodiments, the visualization is dropped by timing out, releasing a visualization type button, releasing a hotkey and the like. In an embodiment, the alternate drop mode is deactivated when the visualization is dropped.

In an embodiment, the user may also add visualizations to the semi-structured workspace by selecting a visualization type within the toolbar. In an embodiment, this is done by clicking a visualization type button. The associated visualization appears in the semi-structured workspace in a predefined location based on the current visualization configuration.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs") programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions to cause at least one data processor of at least one computing system to:
provide a Graphical User Interface (GUI) with a plurality of visualization types and a semi-structured workspace, wherein the semi-structured work space is a distinct section of the GUI that allows a user to select one or more visualizations and arrange them in a limited number of configurations and the visualization type selected comprises at least one of: a record set, a table, a crosstab, a chart, a graphic or a metadata panel;
receive a drag-and-drop of a new visualization into a drop zone in the semi-structured workspace wherein:
the drop zone corresponds to a location in the semi-structured workspace where an associated visualization is displayed; and
the new visualization divides a workspace in two with the new visualization positioned in the drop zone and the associated visualization in the remaining area, wherein the new visualization is automatically linked to the data source query that was linked to the associated visualization and a change of a link to point to a different data source query causes the associated visualization to be updated;
receive input activating an alternative drop mode;
move through a list of available drop zones for a new visualization upon receiving an input such that each available drop zone is highlighted as the available drop zone is moved through; and
drop the new visualization in a selected available drop zone from the list of available drop zones.

2. The computer readable storage medium of claim 1, wherein if there are two previously placed visualizations in the semi-structured workspace then the instructions to receive the drag-and-drop of the new visualization divide the semi-structured workspace into a major portion for one of the previously placed visualizations and a minor portion for each of: the associated visualization and the other of the two previously placed visualizations.

3. The computer readable storage medium of claim 1, wherein if there are three previously placed visualizations in the semi-structured workspace then the instructions to receive the drag-and-drop of the new visualization divide the semi-structured workspace between each of the three previously placed visualizations and the associated visualization.

4. The computer readable storage medium of claim 1, wherein if the drop zone corresponds to the location of a previously placed visualization in the semi-structured workspace then the instructions to receive the drag-and-drop of the new visualization replaces the previously placed visualization with the associated visualization.

5. The computer readable storage medium of claim 1 further comprising executable instructions to:
receive a drag-and-drop of a first previously placed visualization in a first location into a drop zone corresponding to a second location containing a second previously placed visualization;
display the first previously placed visualization in the second location; and
display the second previously placed visualization in the first location.

6. The computer readable storage medium of claim 1, wherein the drop zone is indicated by highlighting the location that corresponds to the drop zone.

7. The computer readable storage medium of claim 1, wherein the data source is OLAP.

8. The computer readable storage medium of claim 1, wherein the data source is one of a group of one or more data sources.

9. The computer readable storage medium of claim 1 further comprising executable instructions to:
change a link to point to a different query in a group of one or more queries; and
update the associated visualization.

10. The computer readable storage medium of claim 1, wherein the semi-structured workspace supports a maximum number of visualizations selected from one of 2, 4, 6, 8, 10, 12, 14 and 16.

11. A method for implementation by one or more data processors of at least one computing system comprising:
   providing a Graphical User Interface (GUI) with a plurality of visualization types and a semi-structured workspace, wherein the semi-structured work space is a distinct section of the GUI that allows a user to select one or more visualizations and arrange them in a limited number of configurations and the visualization type selected comprises at least one of: a record set, a table, a crosstab, a chart, a graphic or a metadata panel;
   receiving a drag-and-drop of a new visualization into a drop zone in the semi-structured workspace wherein:
      the drop zone corresponds to a location in the semi-structured workspace where an associated visualization is displayed; and
      the new visualization divides a workspace in two with the new visualization positioned in the drop zone and the associated visualization in the remaining area, wherein the new visualization is automatically linked to the data source query that was linked to the associated visualization and a change of a link to point to a different data source query causes the associated visualization to be updated;
   receiving input activating an alternative drop mode;
   moving through a list of available drop zones for a new visualization upon receiving an input such that each available drop zone is highlighted as the available drop zone is moved through; and
   dropping the new visualization in a selected available drop zone from the list of available drop zones.

12. A system comprising:
   at least one data processor; and
   memory storing instructions, which when executed by the at least one data processor, result in operations comprising:
      providing a Graphical User Interface (GUI) with a plurality of visualization types and a semi-structured workspace, wherein the semi-structured work space is a distinct section of the GUI that allows a user to select one or more visualizations and arrange them in a limited number of configurations and the visualization type comprises at least one of: a record set, a table, a crosstab, a chart, a graphic or a metadata panel;
      receiving a drag-and-drop of a new visualization into a drop zone in the semi-structured workspace wherein:
         the drop zone corresponds to a location in the semi-structured workspace where an associated visualization is displayed; and
         the new visualization divides a workspace in two with the new visualization positioned in the drop zone and the associated visualization in the remaining area, wherein the new visualization is automatically linked to the data source query that was linked to the associated visualization and a change of a link to point to a different data source query causes the associated visualization to be updated;
      receiving input activating an alternative drop mode;
      move through a list of available drop zones for a new visualization upon receiving an input such that each available drop zone is highlighted as the available drop zone is moved through; and
      dropping the new visualization in a selected available drop zone from the list of available drop zones.

* * * * *